Nov. 10, 1936.    G. A. LYON    2,060,330
SPARE TIRE COVER
Filed Aug. 21, 1933
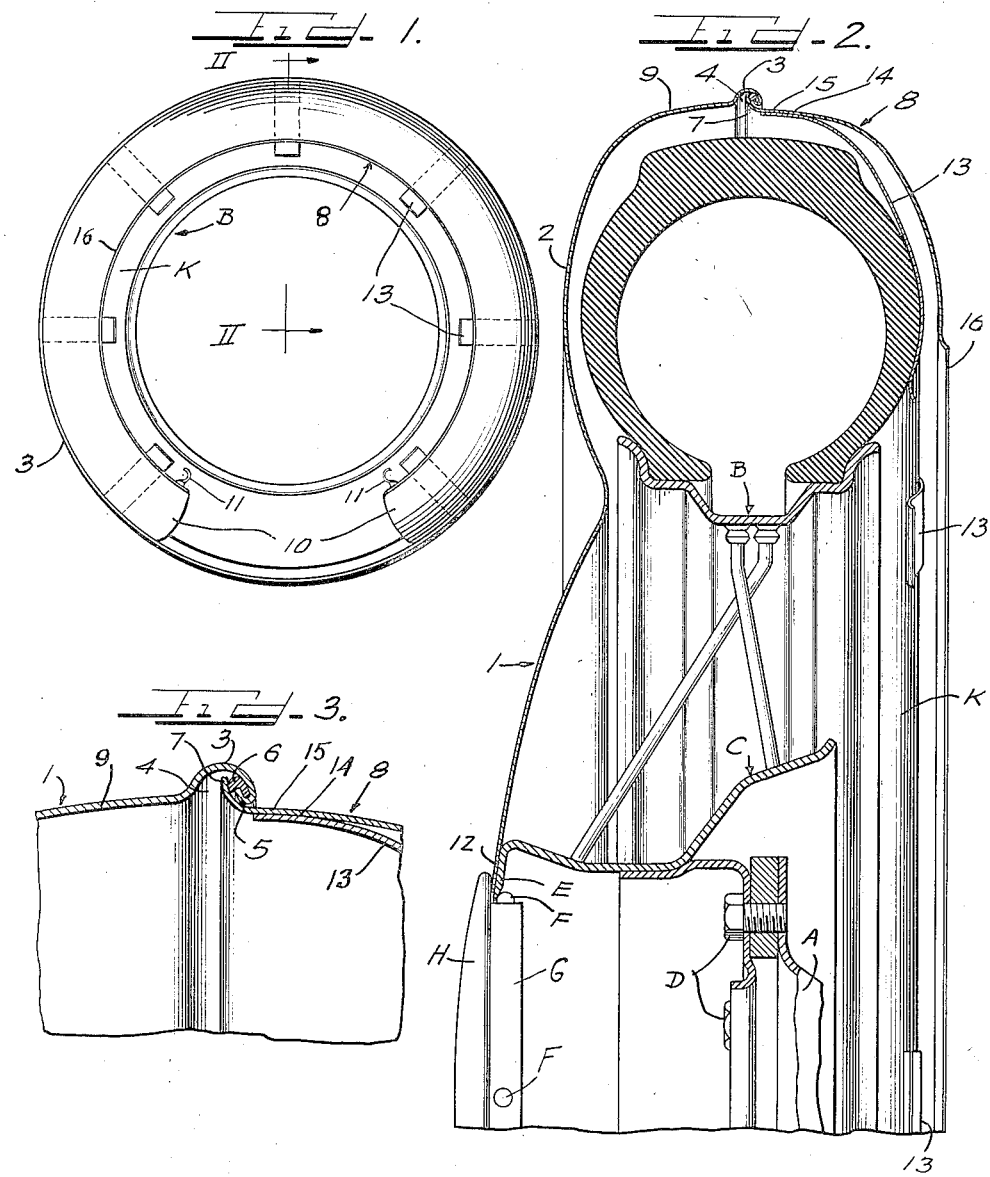
GEORGE ALBERT LYON.

Patented Nov. 10, 1936

2,060,330

UNITED STATES PATENT OFFICE 2,060,330

SPARE TIRE COVER

George Albert Lyon, Detroit, Mich., assignor to Lyon Incorporated, Detroit, Mich., a corporation of Delaware Application August 21, 1933, Serial No. 686,033

9 Claims. (Cl. 150—54)

This invention has to do with tire covers and is concerned more particularly with an improved means whereby a tire cover may be releasably mounted on a spare tire.

It is an object of this invention to provide a tire cover formed to an exposed portion of a tire cover, with means which combines the function of assisting in covering the tire with the function of holding the cover on the tire.

It is another object of the invention to provide a tire cover of the multi-part type including an expansible and contractible member for covering a rear portion of the tire and at the same time serving to hold another part of the cover in proper tire protecting position.

It is a further object of the invention to provide a tire cover embodying a split resilient retaining part which is arranged to be centered upon but spaced from the tire covered thereby.

It is a further object of the invention to provide a substantially non-collapsible cover for an outer side wall and tread portion of a spare tire, with means for engaging the opposite side wall of the tire and causing the cover to be resiliently urged away from the direction in which the cover is moved when it is dismounted from the tire.

Another object of the invention resides in the provision of a multi-part cover comprising a stiff part and a relatively expansible and contractible part cooperating therewith to cover side wall and tread portions of a spare tire without engaging any part of the tire.

It is a further object of the invention to provide inconspicuous means for releasably holding a tire cover in proper tire protecting position, together with means for cushioning said cover and the first means against rattling.

In accordance with the general features of the invention, one part of the cover comprises a drum-like member shaped to cover the outer side wall and substantially one-half the transverse extent of the tread of the tire, said member preferably terminating centrally at the mouth of the front wall of the hub of the spare wheel carrying the tire, to be engaged on opposite sides by the head of the hub cap and by said forward wall of the hub so as to be properly centered thereon. Another part of the cover comprises a preferably split resilient member formed to cover a substantial part of the rear side wall of the tire and to extend over substantially the remaining half of the transverse extent of the tread and within the rear margin of the first part. The second part is preferably inherently expansive so that when telescoped with the first part, said second part engages the first part adjacent the outer periphery of the expansible part, the expansible part being provided with means which engages the rear side wall of the tire. The latter means serves to urge the parts rearwardly.

The cover parts are preferably formed of shape-retaining material such as sheet metal, although other material such as products of phenolic condensation or hard rubber may be employed, and means are accordingly provided to cushion the cooperating parts to prevent rattling therebetween and to provide a friction grip to prevent looseness when the cover is assembled on a spare tire. The expansible part preferably has its margins bent to avoid roughness of edges and thereby avoid injury to the person handling the same.

The resilient part of the cover serves not only to properly support the relatively rigid part, but also centers the latter so that the hub cap for the spare wheel may be shoved into or withdrawn from the hub without interference from the tire cover.

The construction of the cover is such that the hub cap may be secured to the front part of the cover and shoved into interlocking engagement with the hub at the same time that said front cover part is shoved into proper tire protecting position on the tire. The hub cap will thus hold said parts in proper position to permit application of the expansive member as aforesaid.

Other objects and advantages of the invention will appear as the description proceeds.

This invention (in a preferred form) is illustrated in the drawing and hereinafter more fully described.

On the drawing:

Figure 1 is a rear elevational view showing a tire cover construction embodying the invention and applied to a spare tire mounted on a spare wheel, certain details of the spare wheel, such as hub and spokes, being omitted.

Figure 2 is an enlarged fragmentary sectional view taken substantially in the plane designated by the line II—II in Figure 1, details of the spare wheel being, however, shown.

Figure 3 is an enlarged fragmentary sectional view of the details of the connection between the parts of the tire cover forming the subject-matter of the present invention.

Referring more particularly to the drawing, a spare wheel carrier A, carried preferably permanently by an automobile body, such as the rear or outer side in conjunction with or independently of a well such as a fender well, carries a spare wheel B through the hub C by means of bolts D, accessible only through the opening at the front E of the hub. The part E is formed to be engaged at its rear side by locking elements F carried by the sleeve portion G of the hub cap H, the locking elements F being either spring-pressed and readily releasable, or being controlled by a lock, as desired.

The tire cover built in accordance with the illustrated form of the invention comprises a disc 1 which is shaped to conform generally to the front side of a spare wheel and spare tire K and is formed with a central opening of substantially the same size as the opening in the front wall E of the hub so as to provide means whereby the hub cap H may be connected thereto in substantially the same manner in which the hub cap H is secured to the hub C. The disc 1 is formed so that its side wall covering portion 2 is spaced from the adjacent front side wall of the spare tire K when the disc 1 is mounted in proper tire protecting position. The outer peripheral margin of the disc 1 is curled to form a bead 3 which is disposed substantially at the median plane of the tire and is so formed as to provide an inwardly opening circumferential pocket or groove 4. The extreme edge portion 5 is bent upon itself and is tightly crimped upon a strip 6 of cushioning material, such as rubber. The material 6 is so secured that a portion thereof projects forwardly beyond the marginal edge 5 and free thereof to provide an abutment against which the outer peripheral marginal edge portion 7 of another tire covering part 8 is freely engageable as shown in Figures 2 and 3. The portion 3 constitutes the rear terminal margin of the rim portion 9 extending rearwardly from the side portion 2 of the disc 1 and is of such transverse extent as to cover substantially one-half the tread of the tire K.

The tire cover member 8 whose marginal edge portion 7 is adapted to be positioned in the peripheral pocket 4 and yieldably engage the projecting portion of the strip 6 comprises a preferably resilient split arcuate member having spaced ends 10 and formed transversely to overlie a substantial portion of the rear side wall and substantially one-half the tread of the tire, and is also so formed that when in cooperative relation to the cover disc 1, the member 8 is in spaced relation to the tire K. The member 8 is so formed in relation to the disc 1 that it must be contracted in order to enable the outer marginal edge 7 thereof to be reduced in diameter sufficiently to pass forwardly beyond the margin 5 of the disc 1 and into telescoped relation with said disc, after which the inherent tendency of the split member 8 to expand will cause the margin 7 thereof to press outwardly against the strip 6 so that the members 1 and 8 are held in substantially coaxial relationship. To assist in enabling a person to readily take hold of the end portions 10 of the split cover member 8, hooks or other suitable handles or finger grips 11 are provided as shown in Figure 1. The hook members 11 not only enable the end portions 10 to be readily grasped and drawn together to contract the split member 8, but they enable the hands to be placed during the contracting operation in such a way that when the member 8 is moved into telescoped relation with the disc 1, there is no danger of catching the fingers between the two members.

The disc 1 is formed with a substantially centrally located opening of substantially the same size as the opening in the front wall E of the hub C, and the disc 1 is so shaped that when its central portion 12 adjacent the opening thereof is positioned against the forward face of the wall E, the remainder of the disc 1 is in properly spaced relation to the spare wheel and tire. The retaining members F of the hub cap H are formed so as to interchangeably interlock with the hub front wall E and the central portion 12 of the disc 1, and are spaced from the head of the cap to such an extent that, between the head of the cap and the elements F, both the disc portion 12 and the hub wall E may be accommodated as shown in Figure 2. The hub cap H may also interlock with the disc 1 to be moved therewith as a unit in applying the disc 1 to the tire. In such event, the hub cap H is moved rearwardly into interlocked relation with the wall E of the hub C, thereby immediately centering the disc substantially with respect to the spare wheel and tire.

The rear cover member 8 is provided with a series of circumferentially spaced spring elements such as leaf-springs 13, each secured as by spot-welding at 14 to the rim portion 15 of the member 8 and extending as a cantilever from the point of connection in a generally radial and rearward direction to a point somewhat inwardly of the inner margin 16 of the split member 8, and in spaced relation thereto as shown in Figure 2. The spring elements 13 are normally located in greater spaced relation to the margin 16 than shown in Figure 2 and are held under pressure in engagement with the tire cover K and tend to assume positions forwardly of the positions shown. The spring elements 13 offer some resistance to the moving of the cover member 8 forwardly into telescoped relation with the disc member 1, but not sufficient to render such telescoping at all difficult. The elements 13, after the members 1 and 8 are telescoped into proper tire protecting position, engage the tire in such a manner as to exert a forward and inward pressure thereon to thereby urge the cover as a whole rearwardly into proper position and at the same time serve to hold the cover as a whole in properly centered relation to the tire independently of the hub cap H. Thus, if for any reason the hub cap H is removed, without removing the tire cover, said cover will be held in proper centered relation by the spring elements 13 and the latter will also cooperate with the engaging central portion 12 of the disc 1 to hold the cover in proper relation laterally to the spare wheel and tire.

With this construction, due to the clearance provided between the spring elements 13 and the cover member 8, and to the clearance provided between the side wall of the tire K and the side portion 2 of the disc 1, the cover as a whole is enabled to accommodate tires of different diameters and widths without the necessity of any adjusting operation whatever. The arrangement between the disc 1 and the hub C, moreover, is such that the cover may be retained on the spare tire while the spare wheel and tire are removed from the carrier A. That is, removal of the spare wheel and tire from the carrier A does not, as in certain other tire cover constructions heretofore in vogue, require first that the cover construction be removed. The cushioning strip 6 serves not only to prevent rattling between the cover members 1 and 8, but provides sufficient friction between the same and the flange 7 of the member 8 to effectively prevent circumferential sliding therebetween and in that way also serves to hold the members against rattling.

In Figure 1, the ends 10 of the cover member 8 are shown lowermost, although it will be readily understood from the foregoing that either cover member may be disposed in any circumferential relation to the other.

I am aware that many changes may be made and numerous details of construction may be varied through a wide range without departing from the principles of this invention, and I therefore do not purpose limiting the patent granted hereon otherwise than is necessitated by the prior art.

I claim as my invention:

1. A spare tire cover comprising arcuate complemental members formed to substantially cover and be disposed in spaced relation to the side walls and tread of a tire, said members having releasable interlockable margins arranged to interlock at substantially the median plane of the tire, one of said margins being resilient and abnormally contracted and within the other margin when interlocked, whereby said one margin exerts expansive pressure tending to hold said margins interlocked, and means associated with one of said members for supporting said members in said relation.

2. As an article of manufacture, a spare tire cover comprising a pair of sections formed to be joined adjacent the median plane of the tire, one of said sections extending circumferentially clear around the tire and covering the exposed outer side of the tire and the other section comprising a split ring having its outermost edge in overlapping relation with the outermost edge of said one section and being provided with interiorly disposed spaced springs for yieldably contacting the rear of the tire so as to urge the sections rearwardly and prevent rattling thereof, one of said sections having a recess and cushioning means and the cooperating section having its outermost edge turned outwardly into said recess and into a position where it is pressed into engagement with said cushioning means by said springs.

3. A cover for a spare tire constituting part of a spare wheel assembly comprising front and rear arcuate complemental members formed to substantially cover and be disposed in spaced relation to the side walls and tread of the tire, means disposed centrally of the front member and arranged to connect said front member to a hub part of said assembly so as to support the front member from the hub part, said members having releasable interlockable margins arranged to interlock at substantially the median plane of the tire, said cover being provided with spring means yieldably engageable with the rear of the tire so as to urge the front member rearwardly against the hub part and thereby prevent rattling of the cover against the hub part and tire.

4. A tire cover for a tire constituting part of a spare tire assembly comprising a pair of sections formed to be joined substantially at the median plane of the tire, one of said sections being provided with substantially radial arms extending inwardly therefrom at the rear of the tire beyond the widest part of the tire for engagement with the tire and supporting said one section in proper relation to the tire, and means for mounting the other section on a central part of said assembly.

5. A tire cover for a tire constituting part of a spare tire assembly comprising a pair of sections formed to be joined substantially at the median plane of the tire, one of said sections being provided with substantially radial arms extending inwardly therefrom at the rear of the tire beyond the widest part of the tire and engageable with the tire for supporting said one section in proper relation to the tire, and means for mounting the other section on a central part of said assembly.

6. As an article of manufacture, a cover for a mounted spare tire, said cover comprising a pair of sections formed to be joined adjacent the median plane of the tire, one of said sections being formed to extend circumferentially around and clear of the tire and to cover the exposed outer side of the tire and engage the outer side of the tire mounting, the other section comprising an expansible and contractible member formed to have an overlapping relation with said one section, said cover being provided with interiorly disposed spring means arranged to clear the tread of the tire and yieldably contact the rear of the tire under pressure so as to urge the front section rearwardly against the tire mounting and prevent rattling thereof.

7. As an article of manufacture, a cover for a mounted spare tire, said cover comprising a pair of sections formed to be joined adjacent the median plane of the tire, one of said sections being formed to extend circumferentially around and clear of the tire and to cover the exposed outer side of the tire and engage the outer side of the tire mounting, the other section being formed to have a detachably connected relation with said one section, said cover being provided with interiorly disposed spring means arranged to clear the tread of the tire and yieldably contact the rear of the tire under pressure so as to urge the front section rearwardly against the tire mounting and prevent rattling thereof.

8. As an article of manufacture, a spare tire cover comprising a pair of sections formed to be joined adjacent the median plane of the tire, one of said sections extending circumferentially clear around the tire and covering the exposed outer side of the tire and the other section comprising a circular member having its outermost edge in overlapping relation with the outermost edge of said one section, said cover being provided with interiorly disposed spring means for yieldably contacting the rear of the tire under pressure so as to urge the sections rearwardly and prevent rattling thereof, one of said sections having a recess and the cooperating section having its outermost edge disposable in said recess, and cushioning means carried by one of said sections for spacing said edge from the wall of the recess and held under pressure therebetween by said spring means.

9. A tire cover for a tire comprising part of a spare tire assembly having a part disposed centrally of the tire, said cover comprising front and rear circular sections formed to be connected substantially at the median plane of the tire, the rear section having a plurality of substantially radial arms engageable with the tire at the rear of the tire to support the rear section in proper relation to the tire, and means disposed substantially centrally of and cooperating with the front section and a central part of said assembly for mounting said front section on said central part.

GEORGE ALBERT LYON.